United States Patent
Pate et al.

[11] Patent Number: 5,681,408
[45] Date of Patent: Oct. 28, 1997

[54] ACOUSTIC LAMINA WALL COVERING

[75] Inventors: Joseph L. Pate, Columbus; David L. Fishel, Caledonia, both of Miss.

[73] Assignee: GenCorp Inc., Fairlawn, Ohio

[21] Appl. No.: 670,971

[22] Filed: Jun. 26, 1996

Related U.S. Application Data

[62] Division of Ser. No. 250,071, May 27, 1994, which is a division of Ser. No. 13,911, Feb. 5, 1993, Pat. No. 5,364,681.

[51] Int. Cl.$^6$ .................... E04B 1/84; E04F 13/00
[52] U.S. Cl. .................... 156/71; 156/290
[58] Field of Search .................... 156/71, 290, 309.6, 156/209; 428/225, 257, 258, 260, 213; 181/294

[56] References Cited

U.S. PATENT DOCUMENTS

| | | |
|---|---|---|
| 2,982,680 | 5/1961 | Ellis et al. . |
| 3,130,113 | 4/1964 | Silman . |
| 3,391,049 | 7/1968 | Manwaring . |
| 3,496,056 | 2/1970 | Steel et al. . |
| 3,511,335 | 5/1970 | Vddenborg . |
| 3,520,765 | 7/1970 | Bateman et al. . |
| 3,554,852 | 1/1971 | Sugarman et al. . |
| 3,620,906 | 11/1971 | Hannes .................... 428/441 |
| 3,712,846 | 1/1973 | Daniels et al. . |
| 3,953,067 | 4/1976 | Isola .................... 296/214 |
| 3,953,632 | 4/1976 | Robinson .................... 428/95 |
| 4,111,081 | 9/1978 | Hilliard et al. . |
| 4,205,110 | 5/1980 | Jean . |
| 4,219,376 | 8/1980 | Roman . |
| 4,283,457 | 8/1981 | Kolosky . |
| 4,335,802 | 6/1982 | Kirschner . |
| 4,522,863 | 6/1985 | Keck et al. . |
| 4,650,704 | 3/1987 | Rothenberg . |
| 4,851,283 | 7/1989 | Holtrop et al. . |
| 4,894,274 | 1/1990 | Graham et al. . |
| 5,068,001 | 11/1991 | Haussling . |

Primary Examiner—Daniel Stemmer
Attorney, Agent, or Firm—Robert F. Rywalski; Daniel J. Hudak

[57] ABSTRACT

A moisture-permeable acoustic lamina which is usable as a wall covering has a foraminous woven fabric layer adhered to a fabric backing by a discontinuous thermoplastic polymer layer. The woven fabric preferably has an embossed undulate outer surface to enhance the acoustic properties of the lamina and to impart an aesthetic textural appearance. The individual yarns of the woven fabric are preferably substantially uniformly coated with a polyvinyl chloride plastisol to impart stain and wear-resistance, inhibit the growth of molds, fungi, bacteria and the like, and to enhance the appearance of the exposed face of the lamina. The moisture-permeable lamina structure allows wall covering paste, used to adhere the lamina to a wall, to dry at an acceptable rate, yet does not allow paste to bleed through the foraminous woven fabric layer.

5 Claims, 1 Drawing Sheet

ACOUSTIC LAMINA WALL COVERING

CROSS-REFERENCE

This is a division of application Ser. No. 08/250,071, filed on May 27, 1994, of Joseph L. Pate and David L. Fishel, for ACOUSTIC LAMINA WALL COVERING, which in turn is a divisional application of Ser. No. 08/013,911, filed Feb. 5, 1993, now U.S. Pat. No. 5,364,681, issued Nov. 15, 1994.

FIELD OF THE INVENTION

The present invention relates to a sound-absorbing lamina and more particularly to a permeable, three-ply lamina usable as an acoustic wall covering which can be secured to a wall using conventional wall covering paste.

BACKGROUND OF THE INVENTION

Woven fabrics having a plurality of miniature holes or openings generally defined by the spaces between the interlaced threads or yarns have been used as acoustical material on partitions, wall boards, and the like, as between work stations in an office area. The acoustical material made from a woven fabric having a plurality of miniature holes or openings have been generally laminated to an acoustical backing or substrate (typically fiberglass webbing or plastic foam) which is then fastened near the edges of the wall board or partition using clips, nails, tacks, or the like.

The plurality of holes or openings in the face fabric absorb sound and are therefore essential to the acoustical characteristics of the fabric. However, the holes prevent conventional acoustical materials comprised of woven fabric from being used as an ordinary wall covering. Conventional use of the known woven acoustical fabrics with typical wall covering paste is impractical because the paste would flow through the openings, thereby at least partially filling the holes and reducing the ability of the fabric to absorb sound, as well as defacing the exposed decorative surface of the fabric.

Attempts to avoid this problem and provide an acoustical wall covering comprising a woven fabric having a plurality of sound-absorbing holes and which can be pasted to a wall using conventional wall covering paste have been generally unsuccessful.

One way to solve the problem is to form a lamina or plied structure comprising an impermeable thermoplastic backing secured to an acoustic woven fabric. While the impermeable backing will prevent the paste from flowing through and filling the holes in the woven fabric, it also prevents air and moisture from passing through the lamina or plied structure, which severely retards the rate at which the paste will dry and, consequently, promotes or at least facilitates the growth of fungus and molds, whereby unpleasant odors may be generated.

SUMMARY OF THE INVENTION

The invention generally pertains to a three-ply acoustic lamina which can be used as for machine application to substrates or as a wall covering in homes, offices, and the like.

The acoustic lamina of the invention comprises a foraminous woven fabric adhered to a fabric backing by a thermoplastic polymer binder generally in the form of a layer and generally interposed between the woven and fabric backing layers.

The thermoplastic polymer binder is a discontinuous, indiscrete layer which is generally, but not completely nor uniformly, situated between the two fabric layers. The discontinuities such as apertures, spaces, openings, etc., in the thermoplastic polymer binder are formed during the laminating step of the fabrication of the acoustic lamina. The discontinuities in the thermoplastic polymer binder are generally small enough to prevent the paste from flowing through when the acoustic lamina is pasted to a wall, yet large enough to allow air and moisture to pass freely through, thereby maintaining the acoustical characteristics.

Because the fabric backing has a relatively open and porous or reticulated structure which allows for the free passage of air and moisture, and because the woven fabric has an array of holes, apertures, openings, etc., defined by the interlaced threads or yarns, the rate at which moisture can escape from wet paste interposed between a wall and a sheet of the acoustic lamina of the present invention is generally controlled by the rate at which moisture can pass through or permeate the thermoplastic binder. Permeation rates for the acoustic lamina of the invention have been found to be satisfactory and, surprisingly, generally better than permeation rates for many commonly used wall covering materials which do not possess significant sound absorbing properties.

Fabrication of the lamina generally involves a simultaneous embossing and laminating operation wherein the three layers are brought together and laminated and embossed at elevated temperatures and pressures. The exposed surface of the woven fabric layer is preferably embossed to give the exposed decorative surface of the lamina an aesthetically pleasing textural appearance. The embossed surface also provides undulations which help to absorb sound and thereby enhance the acoustical material properties of the lamina.

To impart stain and wear-resistance properties, inhibit the growth of molds, fungi, bacteria and the like, and to enhance the appearance of the exposed or decorative face of the lamina, a thermoplastic polymer composition, i.e., binder, is preferably applied to the the woven fabric to substantially uniformly coat the individual yarns or threads thereof.

The three-ply acoustic lamina of the invention can be affixed to a wall or other substrate using ordinary wall covering paste, without the paste flowing or bleeding through the lamina to the outer or exposed decorative face of the lamina, but with air and moisture being capable of freely passing through to permit drying of the paste.

DETAILED DESCRIPTION OF THE INVENTION

The moisture-permeable, acoustic laminas of the invention are formed by laminating a foraminous woven fabric layer to a fabric backing layer with a thermoplastic polymeric binder such as a layer or film interposed therebetween. During the laminating process the three layers are exposed to elevated temperatures and pressures which cause the material of the thermoplastic polymeric film layer to melt and flow into and around openings or pores in the fabric layers and thereby adhere or bind the fabrics together when the thermoplastic material re-solidifies. Also during the lamination process, as the material of the thermoplastic film flows into the fabric layers, the thermoplastic binder becomes discontinuous so that air and moisture will pass through and easily permeate the lamina.

Figure 1:
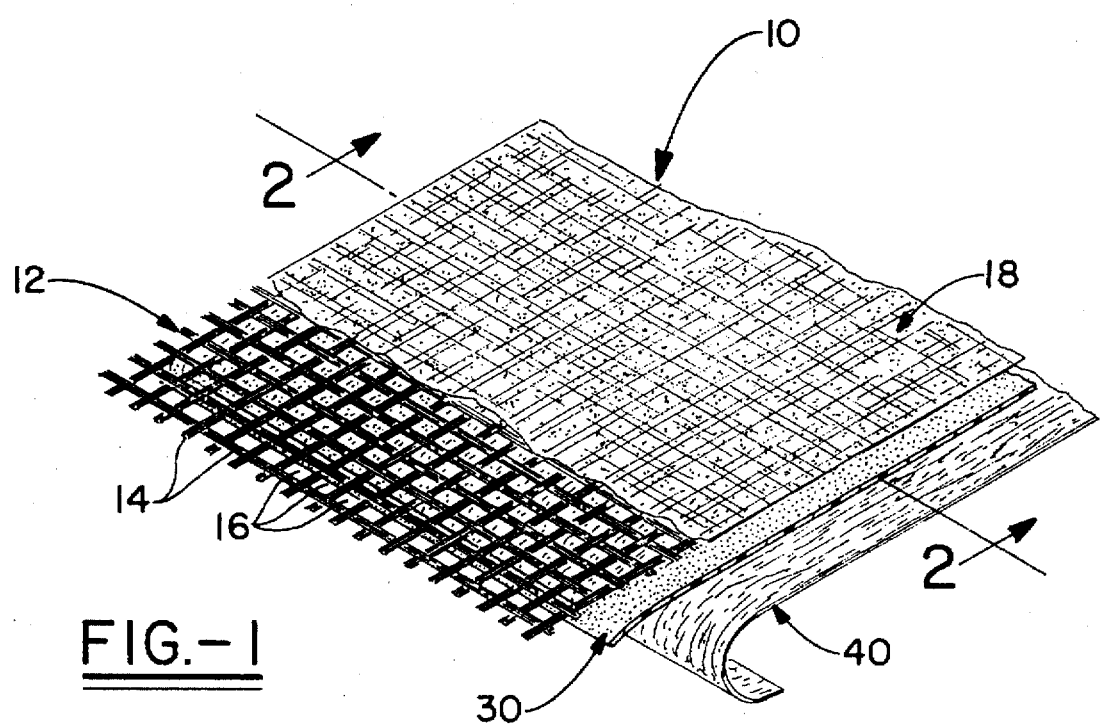
FIG. 1 is a schematic cross-section of an acoustic lamina in accordance with the invention.

A schematic cross-section of a moisture-permeable, acoustic lamina 10 in accordance with the principles of the invention is shown in FIG. 1. The lamina 10 has a woven fabric layer 12 of generally any weave, with one specific weave being shown in FIG. 2 comprising two sets of parallel yarns or threads 14 which are interlaced with one another at right angles. The woven fabric has a relatively open weave which leaves apertures, spaces, or openings 16 in the fabric which act to absorb or break-up sound waves. The woven fabric contains from about 40 to about 90 percent, and desirably from about 50 percent to about 60 percent open space. That is, the total area of the openings 16 comprises from about 40 to about 90 percent of the total surface area of the fabric layer. The threads 14 can generally be made of any known natural or synthetic fiber including cotton, wool, rayon, nylon, polyester, acrylic, polyolefin fibers and mixtures thereof. The woven fabric is preferably made of polyester and has a fiber count of from about 20 to 25 by about 20 to 30 strands per inch (about 8 to 10 by about 8 to 12 strands per centimeter).

The individual yarns 14 of the woven fabric are preferably substantially uniformly coated with a thermoplastic polymer composition to provide a stain and wear-resistant coating 18 which also enhances the appearance of the exposed face of the lamina and inhibits the formation and growth of molds, fungi, bacteria and the like. The polymeric coating is preferably a polyvinyl chloride plastisol comprising small, polyvinyl chloride resin particles dispersed in a conventional plasticizer.

Polyvinyl chloride plastisols are well known to the art and to the literature, and can be formulated to give desired characteristics by using numerous conventional chemical components. Most important to any plastisol formulation is the selection of plasticizers. Examples of suitable plasticizers which can be used include butyl octyl phthalate, dioctyl phthalate, hexyl decyl phthalate, dihexyl phthalate, diisooctyl phthalate, dicapryl phthalate, di-n-hexyl azelate, diisononyl phthalate, dioctyl adipate, tricresyl phosphate, cresyl diphenyl phosphate, polymeric plasticizers such as adipic acid polyester, azelaic acid polyester and sebacic acid polyester, epoxidized soybean oil, octyl epoxy tallate, isooctyl epoxy tallate and mixtures thereof. The amount of plasticizer used may vary from about 30 to 100 parts by weight per 100 parts by weight of resin, with from about 50 to about 75 parts by weight being preferred. Examples of the other conventional components which can be incorporated into the polyvinyl chloride plastisol composition, include various silicas such as precipitated silica, fumed colloidal silica, calcium silicate and the like, ultraviolet light absorbers, fungicides, barium-cadmium-zinc stabilizers, barium-cadmium stabilizers, tin stabilizers, dibasic lead phosphite, antimony oxide, and pigments such as titanium oxide, red iron oxide, phthalocyanine blue or green, and the like. The pigments and other additives or compounding ingredients are used in effective amounts to control color, mildew, stabilization, etc. of the plastisol.

The coating is applied to the woven fabric in an undersaturated amount such that all of the threads 14 are substantially coated, but so that a significant number of the openings 16 defined by the interlaced threads 14 are not blocked. The amount of the surface area of the discontinuations, openings, spaces, etc., based upon the total surface area of the woven fabric layer after deposition of the plastisol is generally from about 35 percent to about 65 percent and preferably from about 40 percent to about 45 percent open.

The exposed face of the polymer-coated woven fabric, that is, the outer surface of the woven fabric which is viewable after the lamina is adhered to a wall or other substrate surface, is preferably printed with a suitable polymer-receptive ink to form desirable decorative patterns and designs. Such inks are well known and can be applied by various methods of printing such as by gravure, flexography, screen printing, jet printing, web printing, etc. The printing operation may be repeated many times, as needed, to vary the colors and designs. The printing can be performed either before or after the woven fabric, polymeric binder and nonwoven fabric have been laminated together.

The polymer-coated woven fabric, whether printed or not printed, is preferably embossed to provide an aesthetically pleasing undulate texture which also enhances the ability of the lamina to absorb or break-up sound waves and serve as an acoustical material. The embossing operation can be performed on the coated woven fabric before lamination of the layers, on the exposed face of the completed lamina, or substantially simultaneously with the laminating operation.

The amount of the various components of the woven fabric can generally vary over a wide range with the weight of the uncoated woven fabric being preferably in the range between 2 and 4 ounces per square yard (68 to 136 grams per square meter). The amount of coating applied to the woven fabric is generally in the range between 4 and 6 ounces per square yard (136 to 203 grams per square meter) of fabric, and the total weight of the coated woven fabric used in the invention is preferably from 6 to about 10 ounces per square yard (203 to 340 grams per square meter). The total average thickness of the woven fabric is generally from about 0.01 to about 0.05 inches (from about 2.54 millimeters to about 12.7 millimeters).

A particularly suitable plastisol-coated woven fabric which can be used in the invention is available from GenCorp Polymer Products, Maumee, Ohio, and sold under the trademark "WebCore." The "WebCore" fabric has a total weight of about 8.0 ounces per square yard (272 grams per square meter), a vinyl plastisol weight of about 5.0 ounces per square yard (170 grams per square meter), and a fabric weight of about 3.0 ounces per square yard (102 grams per square meter). The WebCore" fabric is made of polyester, has a thread count of 22×26 strands per inch, and a total average fabric thickness of about 0.018 inches (4.57 millimeters).

The fabric backing layer 40 is made from a porous or reticulate fibrous mass having a high void volume and through which air and moisture can freely pass. The backing layer can be any fabric which is woven, nonwoven, e.g., a mat, or the like. Suitable materials for the fabric backing include synthetic fibers such as polyester, nylon, acrylic, natural fibers such as cellulose, cotton or wool, mineral fibers such as glass, and mixtures thereof. Blends of polyester and cellulose fibers are preferred, with the amount of cellulose fiber being from about 50 to about 85 percent, and preferably from about 60 to about 70 percent by weight, with the balance being polyester fiber. An example of a specific one-ounce fabric backing which is suitable for use with the invention is available from C. H. Dexter, Windsor Locks, Conn. The thickness of the backing layer is not critical and can generally be in the range between about 5 and 12 mils (about 0.127 and 0.305 millimeters), and preferably from about 6 to about 8 mils (about 0.152 to about 0.203 millimeters).

The film or layer used to bind the woven fabric to the fabric backing generally comprises any thermoplastic material having a melting temperature of from about 200° F. to about 300° F. (from about 93° C. to about 149° C.), desirably from about 230° F. to about 260° F. (from about (110° C. to about 127° C.), and preferably from about 250° F. to about 275° F. (from about 121° C. to about 135° C.). Particularly suitable thermoplastic films which can be utilized include various polyesters, polypropylenes and polyethylenes, with polyethylene being preferred. The thickness of the thermoplastic film layer prior to lamination should generally be from about 2 to about 5 mils (from about 0.05 to about 0.13 millimeters), and preferably from about 2 to about 2.5 mils (from about 0.05 to about 0.065 millimeters).

Fabrication of the acoustic lamina of the invention generally involves a simultaneous embossing and laminating operation. The three layers are overlayed or superimposed with the thermoplastic film binder between the woven fabric and fabric backing layer, and then laminated (and preferably embossed) at elevated temperatures and pressures. The temperatures are from about 250° F. to about 325° F. (from about 121° C. to about 163° C.) and preferably from about 260° F. to about 300° F. (from about 127° C. to about 149° C.), with suitable pressures being from about 800 to about 1500 psi (from about 56 to about 105 kilograms per square centimeter) and preferably from about 900 to about 1,100 psi (from about 63 to about 77 kilograms per square centimeter). Methods and apparatus for laminating sheet materials at elevated temperatures and pressures are well known to the art and to the literature and generally comprise the steps of unrolling and bringing together the individual sheets in overlaying or superimposed relation and passing the juxtaposed sheets through a pair of laminating rollers which heat and exert high pressures on the sheet material, causing the thermoplastic binder to melt and flow into the fabric layers to bind them together upon cooling and re-solidification of the thermoplastic. During the laminating operation the thermoplastic film flows and becomes discontinuous leaving holes, openings, etc., through which air and moisture can permeate, as noted above.

Figure 2:
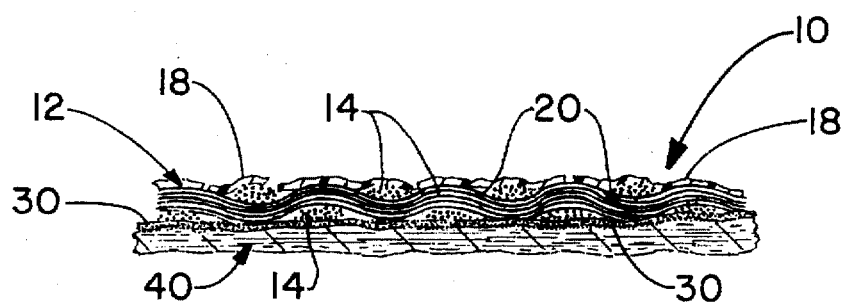
FIG. 2 is a view of the woven fabric layer of the lamina along a line perpendicular to the major dimensions of the fabric sheet.

A schematic of the acoustic lamina of the present invention is shown by FIG. 1. The acoustical lamina, generally indicated by the numeral 10, contains a woven fabric layer 12, as described hereinabove with one specific example being as shown in FIG. 2. Woven fabric layer 12 is bound to fabric backing layer 40 through thermoplastic binder 30 in a manner as described hereinabove. Inasmuch as binder layer 30 flows into both the woven and nonwoven fabric layers, discontinuities, openings, apertures, etc., exist such that, as noted above, paste from the back side of layer 40 generally cannot penetrate the binder layer and yet air can penetrate the acoustical layer, the binder layer, as well as the nonwoven fabric layer.

The acoustic lamina of the invention can be used as an acoustic covering for a variety of substrate surfaces, but is particularly useful as an acoustic wall covering which can be affixed to a wall with commonly used and/or conventional wall covering pastes. Generally, the acoustic lamina is pasted to a wall in a conventional manner by spreading paste over the fabric backing of the lamina and contacting the pasted side of the lamina with the wall surface to adhere the lamina to the wall.

One of the important features of the invention is that it provides an acoustic wall covering to be pasted to a wall or other substrate surface without the paste bleeding through the openings of the foraminous fabric, coating, etc., while at the same time permitting moisture from the paste to permeate through the lamina to allow the paste to dry. The void or openings of the entire laminate is generally less than 30 percent, desirably less than 20 percent, and preferably less than 15 or 10 percent.

Permeability tests were conducted to demonstrate that the lamina of the invention has a higher permeability than various conventional wall coverings. The results for samples tested at 70° F.±1° F. (21° C.±0.5° C.) and 65 percent relative humidity±2 percent are listed in Table I.

TABLE I

| WALLCOVERING SAMPLE | PERMEABILITY |
| --- | --- |
| Type II 20 oz. Osnaburg[1] | 1.60 perms |
| Type I 12 oz. scrim[2] | 2.28 perms |
| Perforated 10 oz. scrim[3] (competitor's) | 13.63 perms |
| FiberTeck[4] | 27.17 perms |
| Acoustic lamina[5] of the invention | 72.00 perms |

[1]Type II - 20 oz. Osnaburg
 1.8 oz/yd$^2$ (61.2 grams/meter$^2$) Woven Fabric Polyester/Cotton Blend
 11.7 oz/yd$^2$ (397.8 grams/meter$^2$) PVC Vinyl Compound Coating
 .021 inches (5.33 millimeters) gauge
[2]Type I - 12 oz. Scrim
 1.0 to 1.1 oz/yd$^2$ (254 to 280 grams/meter$^2$) Woven Fabric Polyester/Cotton Blend
 6.7 oz/yd$^2$ PVC Vinyl Compound Coating
 .017 inches (4.32 millimeters) gauge
[3]Perforated 10 oz. Scrim (Competitor's)
 1.1 oz/yd$^2$ (280 grams/meter$^2$) Woven Fabric Polyester/Cotton Blend
 11.6 oz/yd$^2$ (394.4 grams/meter$^2$) PVC Vinyl Compound Coating
 .018 inches (4.57 millimeters) gauge
 (Reported to have 40,000 micro holes per linear yard.)
[4]FiberTeck
 11.7 oz/yd$^2$ (397.8 grams/meter$^2$) Polyolefin Woven Fabric Acrylic coating on back
 .035 to .038 inches (7.87 to 8.55 millimeters) gauge
[5]WebCore Plus - Glenshire Pattern 8.4 oz/yd$^2$ (286 grams/meter$^2$
 3.0 to 3.2 oz/yd$^2$ (103 to 109 grams/meter$^2$) Polyester Woven Fabric
 4.0 oz/yd$^2$ (136 grams/meter$^2$) PVC Plastisol Coating
 .4 oz/yd$^2$ (13.6 grams/meter$^2$) Binder Layer
 .75 oz/yd$^2$ (25.5 grams/meter$^2$) Secondary Backing
 .024 inches (6.1 millimeters) gauge The results are expressed in units of "perms" which is a term used in the industry corresponding to grams of moisture (water) permeating the sample per square meter per hour under specified conditions. The results show that the acoustic lamina of the invention has a permeability of more than twice that of the most permeable conventional wallcovering tested, and that the paste used to adhere the lamina of the invention can be expected to dry rapidly. Generally, the acoustic lamina of the present invention has a permeability of from about 40 to about 500 and desirably from bout 55 to about 200 perms.

While in accordance with the Patent Statutes, the best mode and preferred embodiment has been set forth, the scope of the invention is not limited thereto, but rather by the scope of the attached claims.

What is claimed is:

1. A method of applying an acoustical lamina to a wall, comprising, applying paste to a moisture-permeable acoustic lamina having a foraminous woven fabric adhered to a porous fabric backing by a discontinuous thermoplastic polymer binder, the foraminous woven fabric having a discontinuous polyvinyl chloride plastisol coating thereon, the paste being applied to the exposed side of the fabric backing; and contacting the pasted side of the acoustic lamina to a wall surface to adhere the lamina to the wall.

2. The method of claim 1, wherein the acoustic lamina has an embossed undulate outer surface.

3. The method of claim 1, wherein the foraminous woven fabric has individual yarns which are coated with the polyvinyl chloride plastisol.

4. The method of claim 3, wherein the foraminous woven fabric is polyester, wherein the fabric backing is formed from a blend of cellulosic and polyester fibers, and wherein the thermoplastic polymer binder is formed of a polyethylene film.

5. A method of applying an acoustic lamina to a wall, comprising;

applying paste to a moisture-permeable acoustic lamina having a foraminous woven fabric adhered to a porous fabric backing by a discontinuous thermoplastic polymer binder, said thermoplastic layer comprising polyethylene, polypropylene, or polyester, said acoustic lamina formed by heating and pressing said foraminous woven fabric, said thermoplastic layer and said porous fabric backing together and causing said thermoplastic layer to melt and flow into said foraminous woven fabric and said porous fabric backing layer thereby forming a discontinuous thermoplastic layer bonding said foraminous woven fabric to said porous fabric backing layer to form the moisture-permeable acoustical wall covering lamina, said foraminous woven fabric discontinuously coated with a polyvinyl chloride plastisol, and contacting the pasted side of said acoustical lamina to a wall surface to adhere the lamina to the wall.

* * * * *